US006666562B2

(12) United States Patent
Nissilä

(10) Patent No.: US 6,666,562 B2
(45) Date of Patent: Dec. 23, 2003

(54) CONNECTING LIGHT SOURCE TO BACKGROUND PLATE

(75) Inventor: Seppo Nissilä, Oulu (FI)

(73) Assignee: Polar Electro Oy, Kempele (FI)

( * ) Notice: Subject to any disclaimer, the term of this patent is extended or adjusted under 35 U.S.C. 154(b) by 93 days.

(21) Appl. No.: 09/854,911

(22) Filed: May 14, 2001

(65) Prior Publication Data

US 2002/0015298 A1 Feb. 7, 2002

(30) Foreign Application Priority Data

May 16, 2000 (FI) .............................................. 20001172

(51) Int. Cl.[7] .............................................. G01D 11/28
(52) U.S. Cl. .............................. 362/26; 362/27; 362/30; 362/104; 362/561; 362/31
(58) Field of Search .............................. 362/23, 26, 27, 362/30, 103, 104, 800, 561, 368, 31

(56) References Cited

U.S. PATENT DOCUMENTS

| | | | | |
|---|---|---|---|---|
| 3,491,245 A | * | 1/1970 | Huther | 250/227.11 |
| 3,609,960 A | * | 10/1971 | Hardesty | 368/67 |
| 3,681,587 A | * | 8/1972 | Brien | 362/26 |
| 3,968,584 A | * | 7/1976 | Kingston | 40/546 |
| 4,181,925 A | * | 1/1980 | Burrows et al. | 362/29 |
| 4,779,166 A | * | 10/1988 | Tanaka et al. | 362/31 |
| 5,548,565 A | * | 8/1996 | Aoyama et al. | 368/227 |
| 5,921,652 A | * | 7/1999 | Parker et al. | 362/31 |
| 6,053,621 A | * | 4/2000 | Yoneda | 362/245 |
| 6,359,668 B1 | * | 3/2002 | Iijima et al. | 349/61 |
| 6,452,872 B1 | * | 9/2002 | Teijido et al. | 368/67 |

FOREIGN PATENT DOCUMENTS

| | | |
|---|---|---|
| EP | 0 751 340 A3 | 1/1997 |
| EP | 0 962 694 A1 | 12/1999 |
| EP | 0 974 785 A1 | 1/2000 |
| JP | 09096682 A * | 4/1997 |
| WO | WO 99/51914 | 10/1999 |

* cited by examiner

Primary Examiner—Stephen Husar
Assistant Examiner—Hargobind S. Sawhney
(74) Attorney, Agent, or Firm—Hoffmann & Baron, LLP

(57) ABSTRACT

A wrist-worn device (100) comprising a background plate (106) to be illuminated for a display (102) of the wrist-worn device (100), and a light source (108A, 108B) for illuminating the background plate (106). The wrist-worn device (100) comprises a guide chamber (300, 302) at least partly surrounding the light source for collecting light emitted by the light source (108A, 108B) and for directing it to the background plate (106).

32 Claims, 4 Drawing Sheets

CONNECTING LIGHT SOURCE TO BACKGROUND PLATE

FIELD OF THE INVENTION

The field of application of the invention comprises wrist-worn devices, such as heart rate monitors, watches, wrist computers, or the like. The invention particularly relates to the illumination of a display on the wrist-worn device in question.

BRIEF DESCRIPTION OF THE RELATED ART

One important, and almost indispensable, characteristic of wrist-worn, watch-like devices, such as wrist watches, heart rate monitors and wrist computers, is the possibility to use the device in low ambient light and no ambient light conditions. The heart rate monitor to be described as an example is a device used in sports and exercising which incorporates the possibility to measure the user's hear rate information during physical exercise. The structure of some known heart rate monitors comprises an electrode belt to be positioned on the chest to measure heart rate information from an electric signal caused by the heart and to transmit the heart rate information to a device carried on the wrist which then shows the heart rate on its display. In conditions of low ambient light the display can be illuminated by pressing a push-button on the wrist-worn device, whereby the display is illuminated by electroluminescence or by light emitted from a light source, such as a LED (Light Emitting Diode). In prior art LED illumination solutions one or more light sources are arranged close to the background plate to allow as much of the light energy emitted by the LED as possible to be used for illuminating the background plate. In a known solution the light emitted from the light source is directed by means of lenses. In prior art solutions, the background plate is an injection-moulded, 1 mm thick plastic plate, for example. During its manufacture, the background plate is provided with macrostructures, for example projections, for directing light to the display. In addition to macrostructures, another attempt to improve the directing of light to the display is to manufacture the background plate such that its becomes gradually thinner further away from the LED.

The prior art solution for illuminating the background plate of a heart rate monitor involves a significant drawback in that a major portion of the directed light energy misses the background plate, thereby causing significant light energy losses.

SUMMARY OF THE INVENTION

It is an object of the invention to provide an improved method and equipment implementing the method for illuminating a background plate of a display on a wrist-worn device. This is achieved with the method to be described below, which is a method for illuminating a background plate of a display on a wrist-worn device. The method employs a light source for emitting light to a guide chamber at least partly surrounding the light source for collecting the light and for directing it to the background plate.

The invention further relates to a wrist-worn device comprising a background plate to be illuminated for the display of the wrist-worn device and a light source for illuminating the background plate. The wrist-worn device comprises a guide chamber at least partly surrounding the light source for collecting light emitted from the light source and for directing it to the background plate.

The preferred embodiments of the invention are disclosed in the dependent claims.

As already stated, the invention relates to a method and equipment for illuminating the background plate of a display on a wrist-worn device. In this specification, 'wrist-worn device' refers to watches, heart rate monitors, wrist computers, or similar devices carried on the wrist. 'Heart rate monitor' is here defined as a device the functions of which comprise at least a function for measuring heart rate, i.e. heartbeat. 'Wrist computer' in turn can be defined for example as a device the functions of which comprise at least a function for locating the user. Further, in this specification, 'display' refers to those parts of a device which are used for visually displaying the information produced by the wrist-worn device to the user of the device. The display therefore comprises for example a background plate to be illuminated, a liquid crystal display and a plastic shield protecting the liquid crystal display and allowing it to be viewed. The wrist-worn device of the invention comprises a guide chamber for collecting light and for directing it from the light source to the background plate. In the solution of the invention, the guide chamber surrounds the light source at least partly, thus allowing light to be optimally collected from the light source. In this context, the term 'surrounding' means that the light source is at least partly inside the space defined by the guide chamber. The method of the invention differs for example from prior art solutions implemented by means of a lens, where the lens is used for directing light energy, but, since there is no collecting function, the loss of energy is significant. The solution of the invention is not restricted to the number of light sources or guide chambers the wrist-worn device comprises.

In a wrist-worn device of a preferred embodiment of the invention the background plate to be illuminated and the one or more guiding chambers form a single, uniform piece, which is advantageous from the point of view of the manufacturing process. Consequently, in one preferred embodiment, the cross-section of the guide chamber is substantially equal in thickness with the background plate. However, the invention is not restricted to a guide chamber and background plate made of one and the same piece, but it is possible that the guide chamber is manufactured separately and then attached to the background plate. In another preferred embodiment, the guide chamber and the background plate are interconnected, i.e. they are joined together. This allows to minimize any losses of light energy caused during the transmission of light. In another preferred embodiment the guide chamber and the background plate are made of a film-like material, as distinct from pieces manufactured by injection moulding, for example. Thin, film-like material is significantly easier to form into the shape required by the guide chamber than pieces made by injection moulding.

In a preferred embodiment, the guide chamber comprises a guide surface on its inner surface, the guide surface being in the area between a first end and second end that the guide chamber comprises. The guide surface is preferably circular. In a preferred embodiment, the guide surface is conical, the diameter of the cross-section of the first end thus being greater than that of the cross-section of the second end. The conical guide chamber is preferably open at its first end and closed at its second end. The guide surface between the first end and the second end preferably defines an open inner space, i.e. the guide means of this embodiment is not a closed plastic cone, for example. The light source is preferably arranged to be at least partly inside the guide means, the numerical aperture of the light source being directed towards the second, i.e. closed end of the cone. Preferably all the light emitted to the numerical aperture by the light source is collected inside the area encircled by the first end of the guide chamber.

According to a second preferred embodiment the guide chamber is shaped like a roll, the diameters of the cross-sections of the first end and the second end of the guide chamber thus being substantially equal. The light source is preferably arranged inside the guide chamber, on the inner surface side thereof, and directed with regard to the roll-shaped guide chamber such that as much of the light emitted by the light source as possible is directed to the wall of the guide chamber, i.e. to the guide surface. This is achieved for example by placing the light source obliquely with respect to the roll-shaped guide chamber. It is apparent that the above-described conical and roll-shaped forms of the guide chamber only serve as examples, the invention not being restricted to them. The inventive idea of the present application also comprises other guide chamber shapes.

The guide chamber of a preferred embodiment comprises at least one guide means for directing light from the guide chamber to the background plate. The guide means is for example a mirror, prism, air bubble, or a similar means causing light to be reflected or refracted. The guide chamber preferably comprises a plural number of guide means meant to make light propagate to the background plate as a uniform flow of light. The guide members are placed either on the guide surface or inside the guide chamber material. In a preferred embodiment, the flow of light directed using the guiding means propagates inside the background material. In another preferred embodiment the flow of light propagates along the surface of the background plate, the guiding chamber and the background plate being provided with a gap between them to allow the light to propagate towards the background plate. The background plate preferably comprises diffractive elements for reflecting the light received from the guide chamber or for directing it substantially perpendicularly with regard to the background plate towards the shield on the wrist-worn device's display.

The wrist-worn device preferably employs a LED as a light source, although other light sources producing optical power can also be used. The guide chamber and the background plate are made of at least partly light conducting material, such as plastic or glass. The background plate preferably conducts light well enough to allow at least some of the light produced by the light source to reach the far side of the background plate when seen from the light source.

The method of the invention defines the steps to be taken to illuminate the background plate of the display of the above-described wrist-worn device of the invention by using a light source and a guide chamber.

An advantage of the invention is that, compared with prior art solutions, it allows the light energy emitted by the light source to be more efficiently used for illuminating the background plate.

BRIEF DESCRIPTION OF THE DRAWINGS

In the following the invention will be described in greater detail with reference to the accompanying drawings, in which.

DETAILED DESCRIPTION OF THE PREFERRED EMBODIMENTS

Figure 1:
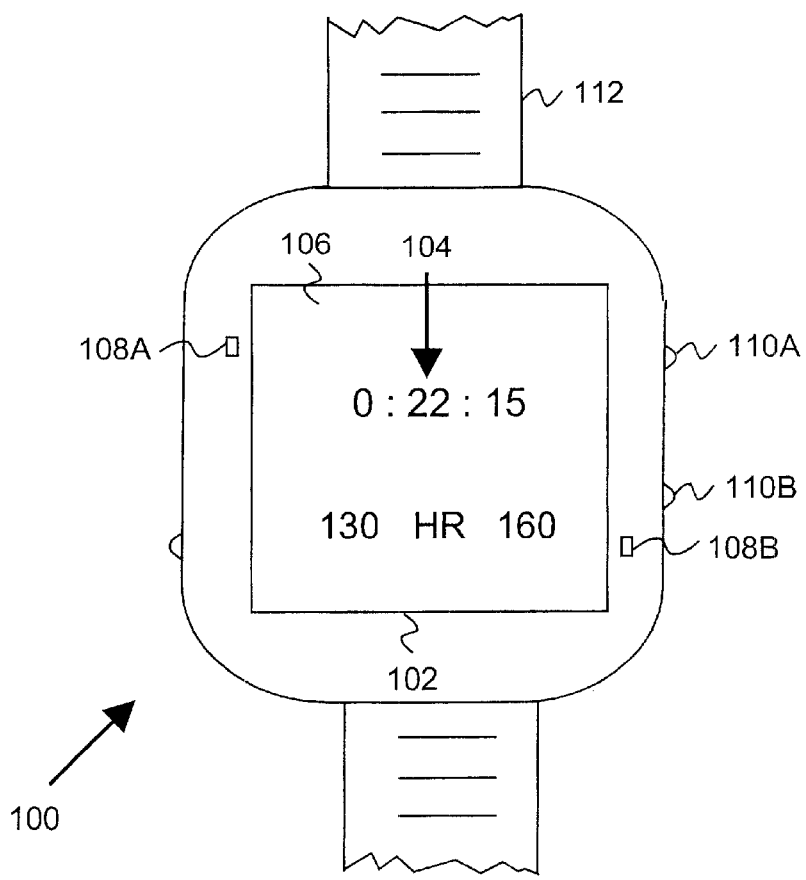
FIG. 1 shows an embodiment of a heart rate monitor.

In the following the invention will be described in connection with preferred embodiments and with reference to accompanying FIGS. 1 to 5. FIG. 1 shows a wrist-worn device, i.e. a heart rate monitor 100, the display of which is illuminated using a prior art solution for display illumination. The heart rate monitor 100 of FIG. 1 is carried on the wrist where the heart rate monitor 100 is attached to with a wrist band 112. The heart rate monitor 100 measures the heart rate either from a blood vessel in the wrist, or it receives magnetic pulses, for example, of the heart rate measured by an electrode belt on the chest. From the point of view of the present invention, it is not relevant to describe in detail how the heart rate is measured or transmitted to the heart rate monitor 100, i.e. to the wrist-worn receiver.

The heart rate monitor 100 of FIG. 1 further comprises a display 102 for displaying the heart rate, the training duration 104, or some other information relating to the heart rate or the training. The display 102 is preferably implemented as a liquid crystal display. The display 102 comprises a shield made of glass or plastic, for example, for protecting the liquid crystal display against humidity and impurities. The display 102 shield is attached to a casing 114 of the heart rate monitor made of plastic or metal, for example. The heart rate monitor 100 comprises keys 110A–110B for controlling the functions of the heart rate monitor 100. Key 110A, for example, is used for controlling the functions of the heart rate monitor 100, for example for activating a heart rate measurement or for alternating the information shown on the display between heart rate and training duration. Key 110B is used for controlling light sources 108A–108B of the heart rate monitor 100 such that when key 110B is pressed, the light sources 108A–108B illuminate the background plate 106 of the display 102 of the heart rate monitor 100 in no ambient light conditions. Key 110B operates such that when it is depressed, the light sources 108A–108B illuminate the background plate 106 continuously, whereas when key 110B is alternately depressed and released, the light sources 108A–108B illuminate the display for 15 seconds. In FIG. 1, the light sources 108A–108B are visible, for the sake of clarity, although in practice they are preferably concealed inside the casing 114 of the heart rate monitor 100 that surrounds the display 102. The light sources 108A–108B, as well as other functions of the heart rate monitor 100 that require operating energy, receive the energy they need from a battery of the heart rate monitor 100, from sunlight, artificial light, or the like.

Figure 2:
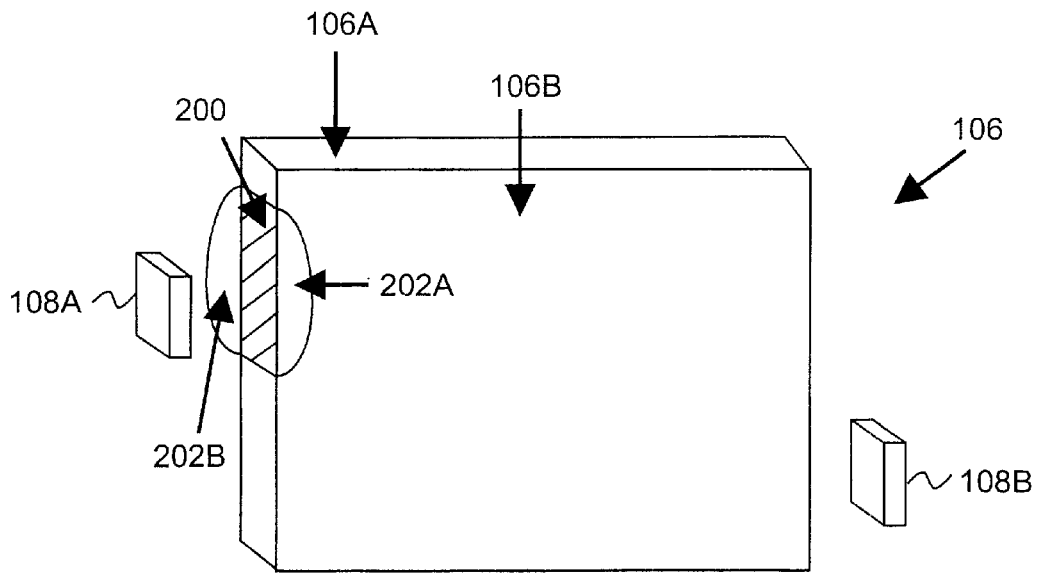
FIG. 2 shows a prior art solution.

FIG. 2 illustrates in greater detail a prior art solution for illuminating the background plate 106 of the heart rate monitor 100 shown in FIG. 1 and the problems related thereto. Light source 108A is placed on one side of the background plate 106, a shadowed area showing a connecting area 200 of the light emitted by light source 108A. Illumination areas 202A and 202B show the areas where the light energy emitted by the light source 108A is wasted, i.e. it is not connected to the background plate 106 to be illuminated.

Figure 3A:
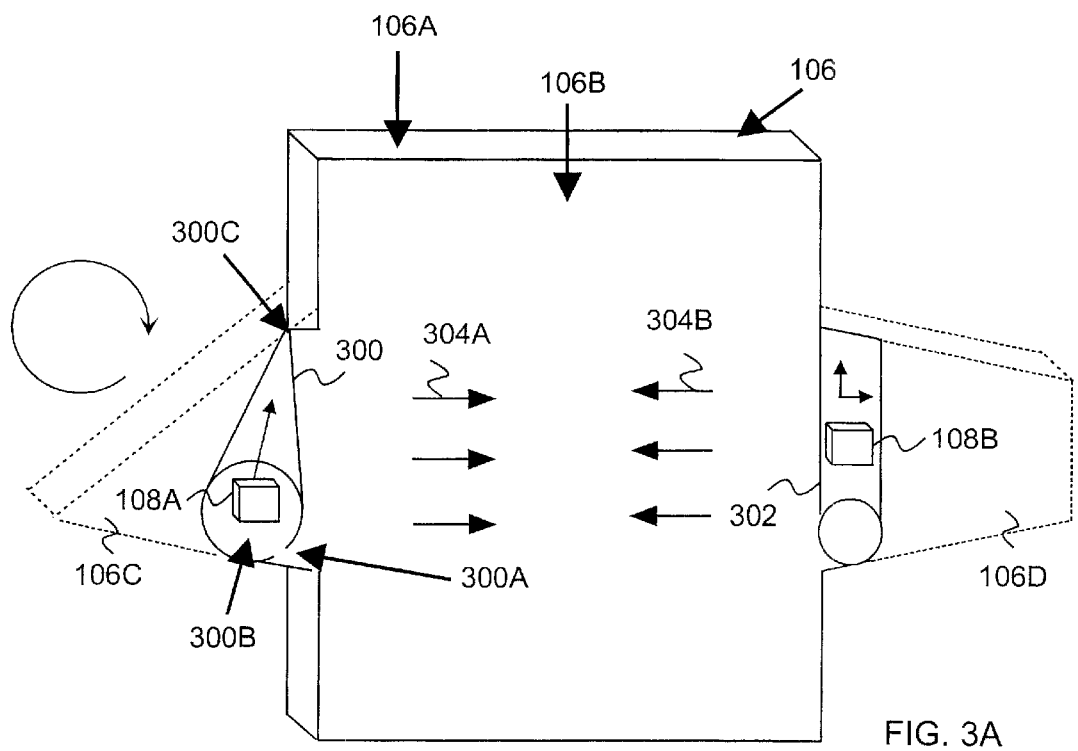
FIG. 3A shows a background plate of an embodiment of the invention.

FIG. 3A shows a solution according to an embodiment of the invention for illuminating the background plate 106. The background plate 106 comprises two guide chambers 300–302: a conical guide chamber 300 on the left and a roll-shaped guide chamber 302 on the right in the Figure. The conical guide chamber 300 is formed by forming or rolling block 106C, which is that portion of the background plate 106 drawn with a broken line, into a cone. The roll-shaped guide chamber 302 is formed by forming or rolling that portion of the background plate 106 indicated by block 106D, which is also drawn with a broken line, into a roll-shape or cylinder. The background plate is preferably cut to comprise blocks 106C and 106D, from which the guide chambers 300–302 can then be shaped during manufacturing. It is apparent that the guide chambers 300–302 can be similar to or different from one another and that their number in the solution of the invention is not limited. The number of the light sources or whether all the light sources are provided with guide chambers is not relevant to the invention either. Moreover, it is apparent that the guide chambers 300–302 may be separate pieces, which are separately manufactured and then attached to the background plate 106 after the background plate 106 has been manufactured. In a preferred embodiment, the background plate 106 is made of thin, film-like material about 0.1–0.5 mm thick, such as light conducting plastic. The background plate 106 can be shown to comprise a back wall 106A, which is preferably made of material that does not conduct light. The background plate 106 further comprises a front wall 106B which is visible in the display 102 of the heart rate monitor 100 shown in FIG. 1. The entire background plate can also be made of material that does not conduct light, such as metal, in which case the light propagates on the surface of the background plate.

The conical guide chamber 300 comprises a first end 300B and a second end 300C, the diameter of the cross-section of the first end 300B being greater than that of the second end 300C. In a preferred embodiment, the first end 300B and the second end 300C are circular. The second end 300C is preferably closed, thus preventing light from leaving the guide chamber through the second end. According to another preferred embodiment, the second end 300C of the conical guide chamber 300 can also be open. The first end 300B of the conical guide chamber 300 is preferably open. Light source 108A, such as a LED, is preferably placed inside the conical guide chamber 300 such that the numerical aperture of the LED is substantially towards the second end 300C of the conical chamber 300. For the sake of clarity, the Figure does not show any wire leading from a power source, such as a battery, to light source 108A. The LED 108A is preferably placed so that substantially all the light emitted by the LED is collected by the guide chamber 300. The inner surface, or guide surface, of the conical guide chamber 300 is preferably provided with diffractive elements to direct light from a groove-like gap 300A in the guide chamber 300 along the surface of the background plate. In one embodiment the gap 300A extends along the entire distance between the first end 300B and the second end 300C. The light 304A directed out of the guide chamber 300 is evenly distributed to the background plate 106.

The example of FIG. 3A shows the roll-shaped guide chamber 302 made by rolling block 106D to the front surface 106B of the background plate. In one embodiment the ends of the guide chamber 302 are open, but they can naturally be also covered with a reflecting material, for example. Light source 108B is preferably placed obliquely with respect to the guide chamber 302, whereby the light emitted by light source 108B is reflected or refracted from the guide means on the inner surface of the guide chamber 302, and, in the end, a uniform flow of light 304B is directed along the background plate material 106. Although some of the light may be wasted through the ends of the guide chamber 302 and possibly through the guide surface between the ends, the described solutions of the invention produce a significant improvement to the prior art solutions.

Figure 3B:
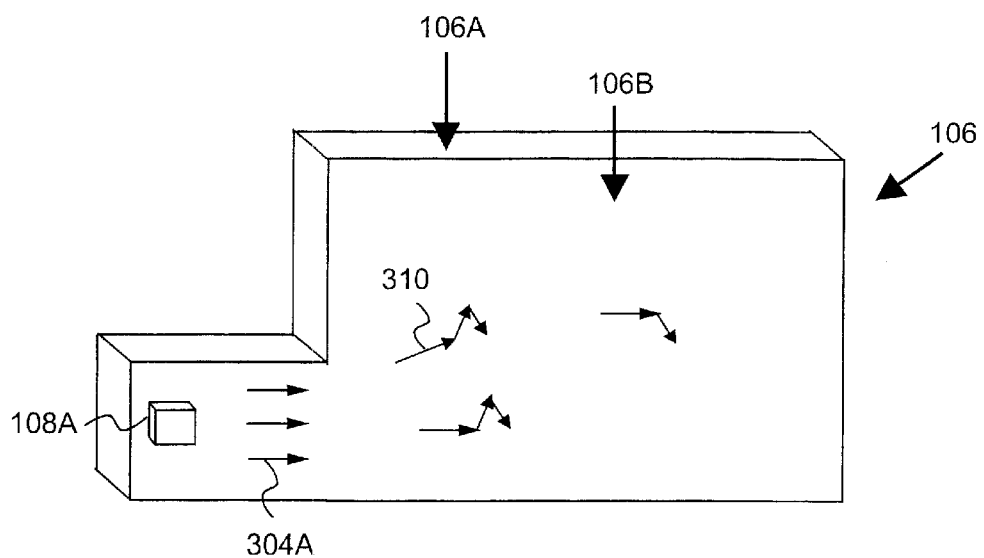
FIG. 3B shows a background plate of an embodiment of the invention.

FIG. 3B shows an embodiment of the illumination solution. The flow of light 304A emitted by the light source 108A is directed on the background plate 106 as a uniform flow of light in the area between the between the back surface 106A and the front surface 106B, or along the front surface 106B. In an embodiment of the invention, the back surface 106 of the background plate 106 is provided with diffractive elements reflecting light beams 310 from the back surface of the background plate 106 perpendicularly towards the front surface. The light beams 310 continue through the front surface 106B, the user of the heart rate monitor, for example, perceiving this as illumination of the background plate 106.

Figure 4A:
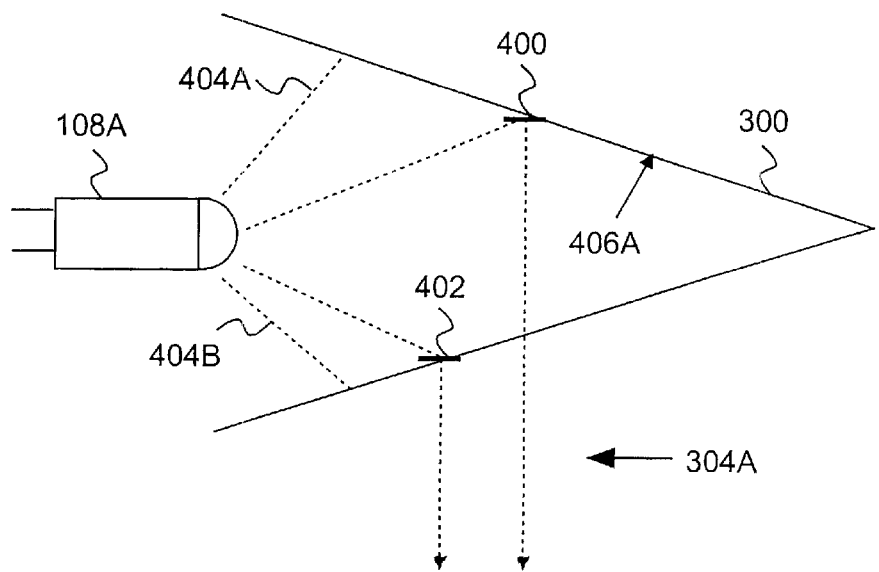
FIG. 4A shows a conical guide chamber of an embodiment of the invention.
Figure 4B:
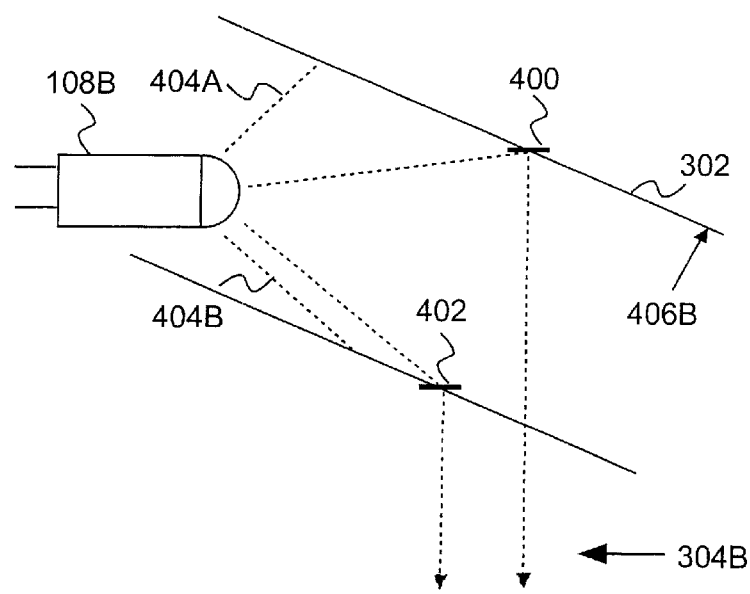
FIG. 4B shows a roll-shaped guide chamber of an embodiment of the invention.

In the following the invention is described with reference to FIGS. 4A and 4B. FIG. 4A shows light source 108A located in connection with the conical guide chamber 300. In a preferred embodiment of the invention, the light source is placed such that substantially all the light emitted by light source 108A to its numerical aperture collects into the guide chamber 300, i.e. particularly to its inner surface, or guide surface 406A, facing light source 108. The numerical aperture of light source 108A can be defined as the angle between outer light beams 404A and 404B emitted by light source 108. The guide means 300 further comprises one or more guide members, such as a mirror 400 and prism 402 shown in FIG. 4A. The function of the guide members is to direct the light 304A towards the background plate. FIG. 4B shows light source 108B and the roll-shaped guide chamber 302. Light source 108B is arranged obliquely with respect to the guide chamber 302, whereby as much of the light emitted by light source 108B to the numerical aperture defined by the beams 404A–404B as possible meets the guide surface 406 of the guide chamber 302. Further, the light 304B is directed towards the background plate by reflecting or refracting it with the guide members 400–402. As already stated in connection with FIG. 4A, the guide members can be implemented in a prior art manner using for example a mirror, prism, air bubble, or the like. The guide member 400–402 can also be made of a different material than the guide surface 406B, whereby the light is strongly refracted for example from the guide surface 406B which allows it to be directed towards the background plate. It is to be noted that for the sake of clarity, the above FIGS. 4A–4B do not show reflection or refraction patterns for all the light beams. It is also apparent that the light beams can reflect in the guide chamber (300–302) a number of times before they are directed out of the guide chamber (300–302) towards the background plate.

Figure 5:
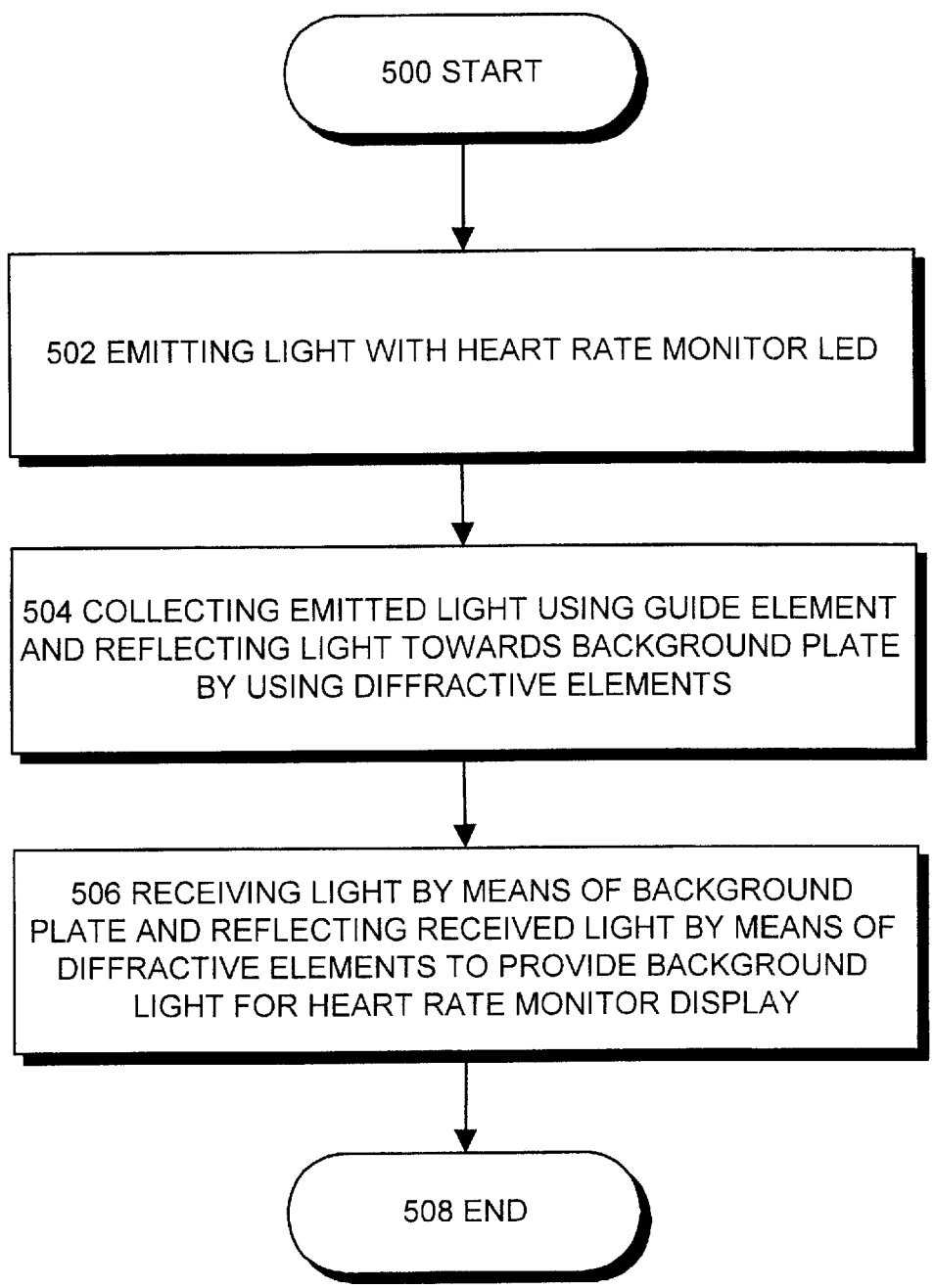
FIG. 5 shows a preferred embodiment of a method of the invention.

In the following, the method of the invention for illuminating a background plate will be described with reference to a working example and to FIG. 5. In method step 502 light is emitted using a LED of the heart rate monitor. The LED is placed with respect to a guide chamber guiding light such that substantially all the light emitted by the LED into its numerical aperture is collected, in method step 504, by a conical or roll-shaped guide chamber. The thickness of the guide chamber is substantially equal to that of the background plate. Substantially equal thickness means that the thickness of the guide chamber and that of the background plate differ by 0.2 mm or less. The guide chamber and the background plate are preferably made of the same piece, such as a thin plastic film, whereby they are defined to be of equal thickness within the error limits applied in the manufacturing process. In method step 504 the light is further directed towards the background plate. This is carried out using for example diffractive elements, such as mirrors or prisms, or by varying the refraction coefficient of the guide chamber material by means of material changes or air bubbles. Light is directed from the guide chamber to the background plate either inside the background plate material or along the surface of the background plate. In one implementation of an embodiment, if the light is directed along the surface of the background plate, there is left a gap between the guide chamber and the background plate to allow the light to propagate. In method step 506, the background plate receives the substantially unidirectional and evenly distributed light for reflection to the display of the heart rate monitor. Reflection taking place on the background plate is carried out similarly as the guiding of light that takes place in the guide chamber.

Although the invention is described above with reference to examples according to the accompanying drawings, it is apparent that the invention is not restricted to them, but may vary in many ways within the inventive idea disclosed in the claims.

What is claimed is:

1. A wrist-worn device comprising a background plate to be illuminated for a display of the wrist-worn device, a light source for illuminating the background plate, and a guide chamber formed by rolling at least a portion of the background plate, the guide chamber at least partly surrounding the light source for collecting light emitted by the light source and for directing it to the background plate.

2. A wrist-worn device according to claim 1, wherein the background plate and the guide chamber are interconnected.

3. A wrist worn device according to claim 1, wherein the background plate and the guide chamber form a uniform piece.

4. A wrist-worn device according to claim 1, wherein the background plate and the guide chamber are made of the same material.

5. A wrist-worn device according to claim 1, wherein the background plate and the guide chamber are made of a thin, film-like material.

6. A wrist-worn device according to claim 1, wherein the guide chamber comprises a first end and a second end.

7. A wrist-worn device according to claim 6, wherein the inner surface of the guide chamber comprises a guide surface, and wherein the guide surface is in the area between the first end and the second end.

8. A wrist-worn device according to claim 6, wherein first end and the second end.

9. A wrist-worn device according to claim 8, wherein the guide chamber is positioned with regard to a light source such that substantially all the light emitted by the light source to its numerical aperture is arranged to be directed inside the circle formed by the first end of the guide chamber.

10. A wrist-worn device according to claim 8, wherein the guide chamber is conical in shape, the diameter of the cross-section of the first end being greater than the diameter of the cross-section of the second end.

11. A wrist-worn device according to claim 8, wherein the guide chamber is roll-shaped, the diameter of the first end being substantially equal to the diameter of the second end.

12. A wrist-worn device according to claim 1, wherein the guide chamber comprises an inner surface, the inner surface comprising a guide surface.

13. A wrist-worn device according to claim 12, wherein the space defined by the guide surface is open.

14. A wrist-worn device according to claim 12, wherein the guide chamber comprises at least one guide means for directing the light that meets the guide means from the guide chamber to the background plate, the guide means being located on the guide surface.

15. A wrist-worn device according to claim 1, wherein the guide chamber comprises at least one guide means for directing the light that meets the guide means from the guide chamber to the background plate.

16. A wrist-worn device according to claim 15, wherein the guide means comprises at least one of a mirror, prism, and air bubble changing the direction of light.

17. A wrist-worn device according to claim 1, wherein the background plate comprises at least one diffractive element for directing light from the surface of the background plate towards the display of the wrist-worn device.

18. A wrist-worn device according to claim 1, wherein the light source is a LED.

19. A method for illuminating a background plate of a display of a wrist-worn device, the method comprising the step of emitting light with a light source for collecting the light into a guide chamber formed by rolling at least a portion of the background plate, the guide chamber at least partly surrounding the light source in the wrist-worn device and for directing it to the background plate.

20. A method according to claim 19, wherein the background plate and the guide chamber are interconnected.

21. A method according to claim 19, wherein the background plate and the guide chamber form a uniform piece.

22. A method according to claim 19, wherein the background plate and the guide chamber are made of the same material.

23. A method according to claim 19, wherein the background plate and the guide chamber are made of a thin, film-like material.

24. A method according to claim 19, wherein the guide chamber is positioned with regard to a light source such that substantially all the light emitted by the light source to its numerical aperture is directed inside the area surrounded by the first end of the guide chamber.

25. A method according to claim 19, wherein the guide chamber is conical in shape, the diameter of the cross-section of the first end of the guide chamber being greater than the diameter of the cross-section of the second end of the guide chamber.

26. A method according to claim 19, wherein the guide chamber is roll-shaped, the diameter of the first end being substantially equal to the diameter of the second end.

27. A method according to claim 19, wherein the space defined by the guide surface of the wrist-worn device is open.

28. A method according to claim 19, the method further comprising the step of directing the light that meets the guide means of the guide chamber with the guide means to the background plate.

29. A method according to claim 19, wherein the guide surface is provided with a guide means that changes the direction of light.

30. A method according to claim 29, wherein the guide means comprises at least one of a mirror, prism, and air bubble changing the direction of light.

31. A method according to claim 19, the method further comprising the step of directing the light from the surface of the background plate towards the display of the wrist-worn device by means of at least one diffractive.

32. A method according to claim 19, wherein the light source is a LED.

* * * * *